United States Patent
Tukachinksy

(10) Patent No.: US 7,601,420 B2
(45) Date of Patent: Oct. 13, 2009

(54) SLIP-CLING STRETCH FILM

(75) Inventor: Alexander Tukachinksy, Jefferson, MA (US)

(73) Assignee: Berry Plastics Corporation, Evansville, IN (US)

( * ) Notice: Subject to any disclaimer, the term of this patent is extended or adjusted under 35 U.S.C. 154(b) by 52 days.

(21) Appl. No.: 11/763,639

(22) Filed: Jun. 15, 2007

(65) Prior Publication Data

US 2008/0311365 A1    Dec. 18, 2008

(51) Int. Cl.
B32B 27/32    (2006.01)

(52) U.S. Cl. .................. 428/212; 428/220; 428/352; 428/354; 428/411.1

(58) Field of Classification Search ............. 428/195.1, 428/212, 220, 411.1, 352, 354
See application file for complete search history.

(56) References Cited

U.S. PATENT DOCUMENTS

| | | | |
|---|---|---|---|
| 2,668,988 A | 2/1954 | Bailey et al. | |
| 3,576,051 A | 4/1971 | Click et al. | |
| 4,073,782 A | 2/1978 | Kishi et al. | |
| 4,082,877 A | 4/1978 | Shadle | |
| 4,682,941 A | 7/1987 | Upmeier et al. | |
| 5,085,927 A * | 2/1992 | Dohrer | 428/220 |
| 5,208,096 A * | 5/1993 | Dohrer | 428/218 |
| 5,458,841 A | 10/1995 | Shirrell | |
| 5,531,393 A | 7/1996 | Salzsauler et al. | |
| 5,741,389 A | 4/1998 | Yoshino | |
| 5,752,362 A * | 5/1998 | Eichbauer | 53/399 |
| 5,907,943 A | 6/1999 | Eichbauer | |
| 5,955,205 A * | 9/1999 | Ramsey et al. | 428/516 |
| 5,981,028 A | 11/1999 | Sugawa et al. | |
| 6,083,611 A | 7/2000 | Eichbauer et al. | |
| 6,093,480 A | 7/2000 | Eichbauer | |
| 6,126,769 A | 10/2000 | Scharrenberg | |
| 6,168,840 B1 | 1/2001 | Johnstone | |
| 6,171,681 B1 * | 1/2001 | Mascarenhas et al. | 428/141 |
| 6,299,968 B1 | 10/2001 | Karaoglu et al. | |
| 6,361,875 B1 | 3/2002 | Karaoglu et al. | |
| 6,413,346 B1 | 7/2002 | Planeta et al. | |
| 6,492,010 B1 | 12/2002 | Karaoglu et al. | |
| 6,495,245 B1 | 12/2002 | Karaoglu et al. | |
| 6,592,699 B1 | 7/2003 | Mehta et al. | |
| RE38,429 E | 2/2004 | Eichbauer | |
| 6,692,805 B2 | 2/2004 | Bonke | |
| 6,794,024 B1 | 9/2004 | Walton et al. | |
| RE38,658 E | 11/2004 | Eichbauer | |
| 7,172,815 B2 | 2/2007 | Cook et al. | |
| 7,226,655 B2 | 6/2007 | Iriya et al. | |
| 2003/0189118 A1 | 10/2003 | Smith | |
| 2006/0243842 A1 | 11/2006 | Garcia | |

* cited by examiner

Primary Examiner—David R Sample
Assistant Examiner—Lawrence D Ferguson
(74) Attorney, Agent, or Firm—Barnes & Thornburg LLP

(57) ABSTRACT

A multilayer stretch film having a high slip surface and an aggressive cling surface for wrapping items or loads for ease of transport is disclosed. In one embodiment, there is disclosed a multilayer film comprises a first surface having a coefficient of friction at least less than about 0.9, comprising at least polypropylene and high density polyethylene, a second surface having a cling force to the first surface at least greater than about 5 g/in, comprising at least ethylene methyl acrylate copolymer and a tackifier resin, and a core layer, positioned between the first surface and the second surface, comprising at least linear low density polyethylene or its blend.

43 Claims, 1 Drawing Sheet

SLIP-CLING STRETCH FILM

BACKGROUND OF THE INVENTION

1. Field of the Invention

Embodiments of the present invention generally relate to a multilayer stretch film. More specifically, embodiments of the present invention relate to a multilayer stretch film having a high slip surface and an aggressive cling surface for wrapping items or loads for ease of transport.

2. Description of the Related Art

The use of thermoplastic stretch wrap films for the overwrap packaging of goods, and in particular, large rolls of paper or carpet, is a commercially significant application of polymer film. Monolayer stretch wrap films have identical surfaces on both sides, while multilayer stretch films can have a non-cling surface and a cling surface. The non-cling surface generally does not cling to itself and prevents adjoining wrapped goods from sticking to one another. The cling surface enables the film to stick to itself to prevent unwrapping during transport. However, as the non-cling surface decreases in coefficient of friction, the cling surface must increase its cling aggressiveness to enable the film to stick to itself when wrapped around goods.

Thus, there is a need for an improved slip-cling stretch film having a high slip surface and an aggressive cling surface.

SUMMARY OF THE INVENTION

Embodiments of the present invention relate to a multilayer stretch film having a high slip surface and an aggressive cling surface for wrapping items or loads for ease of transport.

In one embodiment, a multilayer film comprises a slip layer comprising at least polypropylene and high density polyethylene blend, a cling layer comprising at least ethylene methyl acrylate copolymer and a tackifier, and an intermediary layer comprising at least linear low density polyethylene resin or its blend.

In another embodiment of the present invention, a multilayer film comprises a first surface having a coefficient of friction at least less than about 0.9, comprising at least polypropylene and high density polyethylene, a second surface having a cling force to the first surface at least greater than about 5 g/in, comprising at least ethylene methyl acrylate copolymer and a tackifier resin, and a core layer, positioned between the first surface and the second surface, comprising at least linear low density polyethylene resin.

BRIEF DESCRIPTION OF THE DRAWING

So the manner in which the above recited features of the present invention can be understood in detail, a more particular description of embodiments of the present invention, briefly summarized above, may be had by reference to embodiments, which are illustrated in the appended drawing. It is to be noted, however, the appended drawing illustrates only typical embodiments of embodiments encompassed within the scope of the present invention, and, therefore, is not to be considered limiting, for the present invention may admit to other equally effective embodiments, wherein.

Figure 1:
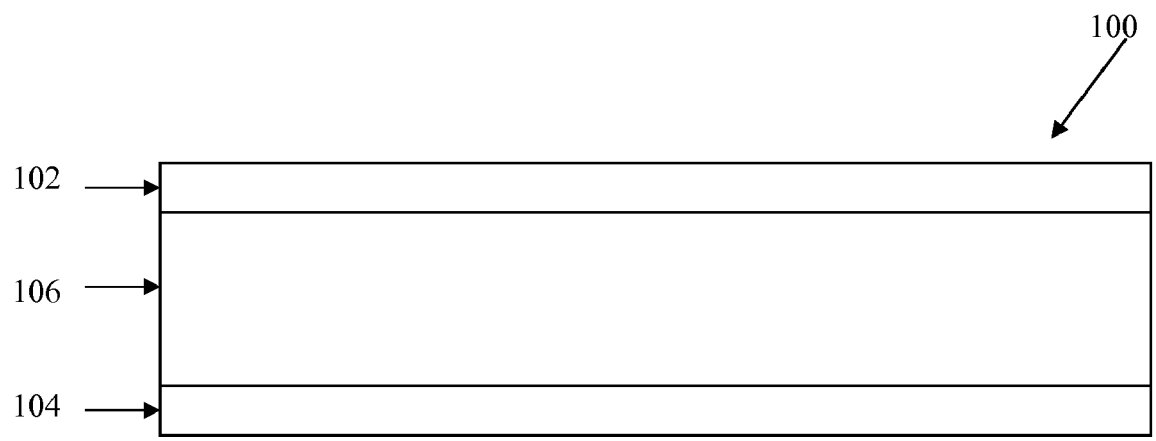
FIG. 1 depicts a cross-sectional view of a film in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

FIG. 1 depicts a cross-sectional view of a film in accordance with one embodiment of the present invention. The film 100 generally comprises a slip layer 102, a cling layer 104, and an intermediary layer 106 positioned between the two surface layers. The slip layer 102 comprises between about 5% by weight to about 20% by weight of the film 100. The cling layer 104 comprises between about 5% by weight to about 20% by weight of the film 100. In many of the embodiments, the balance of the film 100 is the intermediary layer 106.

The slip layer 102 generally comprises a polymer composition yielding a low coefficient of friction. The coefficient of friction of the slip layer 102 is at least less than about 0.9. In one embodiment, the coefficient of friction of the slip layer 102 is about 0.5.

The slip layer 102 generally comprises a polypropylene (PP) and high-density polyethylene (HDPE) composition. The PP may be provided in a range of about 80% by weight to about 99% by weight, and the balance of the composition comprises HDPE. In one embodiment, the PP is provided in about 90% by weight and the HDPE is provided in about 10% by weight of the slip layer 102. In another embodiment, the PP is provided in about 85% to about 95% by weight, the HDPE is provided in about 2% to about 10% by weight, and the balance comprises at least one resin or additive, such as abrasion-resistant resins, colorants, stabilizers, UV absorbers, and the like.

In one exemplary embodiment, the PP is a polypropylene homopolymer plastic material commercially available from the Huntsman Corporation of The Woodlands, Texas, under the name Huntsman Polypropylene H1200. The PP has a density of about 0.900 g/cm3, and a mass-flow rate (MFR) of about 12 g/10 min, as determined by ASTM test methods D1505 and D1238, respectively.

In another exemplary embodiment, the HDPE is a high-density polyethylene plastic material, commercially available from the Westlake Chemical Corporation of Houston, Tex., under the name Westlake HDPE HC 6008. The HDPE has a density of about 0.962 g/cm3, and a MFR of about 8.2 g/10 min, as determined by ASTM test methods D1505 and D1238, respectively.

The cling layer 104 generally comprises a polymer composition yielding a high cling. The cling force of the cling layer 104 to the slip layer 102, when wrapped around a good or load, is at least greater than about 5 g/in. In one embodiment, the cling force of the cling layer 104 to slip layer 102 is about 40 g/in.

The cling layer 104 generally comprises ethylene methyl acrylate copolymer (EMA) and a tackifying resin. The EMA may be provided in a range of about 80% by weight to about 99% by weight, and the balance of the composition comprises the tackifier resin. In one embodiment, the EMA is provided in about 95% by weight and the tackifying resin is provided in about 5% by weight of the slip layer 102. In another embodiment, the EMA is provided in about 80% to about 95% by weight, the tackifying resin is provided in about 1% to about 7% by weight, and the balance comprises at least an additional resin or additive, such as UV protective additives, puncture resistant resins, and the like.

In one exemplary embodiment, the EMA is an ethylene methyl acrylate copolymer material commercially available from Westlake Chemical Corporation of Houston, Tex., under the name Westlake EMAC SP2268. The EMAC has a density of about 0.945 g/cm3, a MFR of about 10.0 g/10 m and contains about 24% of methyl acrylate co-monomer. In another exemplary embodiment, the tackifying resin is the tackifying resin commercially available from Eastman Company of Kingsport, Tenn., under the name Eastotac H-100R. The tackifying resin has a density of about 1.04 g/mL.

The cling layer 104 may further comprise additional resins and additives. In one embodiment, the cling layer 104 comprises a puncture resistant resin. In another embodiment, the cling layer 104 may also comprise a low density polyethylene (LDPE) resin having a density of between about 0.91 and 0.94 g/cm.sup.3, a LLDPE resin having a density of between about 0.915 and 0.925 g/cm.sup.3, or a very low density polyethylene (VLDPE) resin having a density of between about 0.88 and 0.915 g/cm.sup.3.

Further examples of useful cling additives include polyisobutylenes (PIB) having a number average molecular weight in the range from about 1,000-3,000, preferably about 1200-1800, as measured by vapor phase osmometry, amorphous atactic polypropylenes, e.g., those having an average molecular weight of about 2000, and polyterpenes. Examples of cling enhancing resins include, but are not limited to, ethylene-vinyl acetate (EVA) copolymers containing from about 5% to about 15% by weight copolymerized vinyl acetate and VLDPE resins having densities from 0.88 to 0.912 and melt indexes from 0.5 to 10 g/10 min. The optional cling additives may be present in the cling layer 104 in a concentration of from about 0.5% to about 10% by weight of the cling layer 104 composition.

Optionally, in some embodiments, polyethylene resins are utilized in the cling layer 104, and are further blended or alloyed with minor amounts, e.g., up to about 20% by weight total, of one or more other suitable resins to achieve a desired range of physical/mechanical properties in the film product. For example, suitable resins such as ethyl vinyl acetate copolymer, and LLDPE resins may be useful when blended with the cling layer 104. In many embodiments, conventional film additives such as antioxidants, UV stabilizers, pigments, dyes, etc., are utilized in the cling layer 104 of the film 100.

The intermediary layer 106 generally comprises a polymer composition yielding necessary physical properties of the film 100, such as extensibility, load containment, tear and puncture resistance, and the like. In one embodiment, the intermediary layer 106 comprises a linear low density polyethylene (LLDPE) and metallocene polyethylene (m-PE) resin composition. In another embodiment, the intermediary layer 106 further comprises white pigment such as titanium dioxide.

The LLDPE may be provided in a range of between about 50% and 100% by weight, and the m-PE resin is provided in a range of between about 0% and 50%. In particular embodiments, the titanium dioxide may be provided between about 0.1% to about 5% by weight. In one embodiment, the LLDPE is provided in about 68% by weight, the m-PE resin is provided in about 30% by weight, and the titanium dioxide is provided in about 2% by weight of the intermediary layer 106. In such an embodiment, the remaining composition comprises conventional additives, resins, and the like, to provide the desired performance characteristics.

In one exemplary embodiment, the LLDPE is a linear low density polyethylene material commercially available from Dow Plastics of Midland, Mich., under the name Dowlex 2247G. The LLDPE has a density of about 0.917 g/cm3 and a MFR of about 2.3 g/10 min. In another exemplary embodiment, the m-PE resin is an enhanced polyethylene resin commercially available from Dow Plastics of Midland, Mich., under the name Elite 5230G. The Elite resin has a density of about 0.916 g/cm3 and a MFR of about 4.0 g/10 min. The titanium dioxide is provided as an element of a white concentrate. In one embodiment, the titanium dioxide is contained within a white concentrate from Ampacet Corporation of Tarrytown, N.Y., under the name Ampacet White 110359-C.

Additives and/or resins may be provided in the intermediary layer 106, such as those discussed above with respect to the slip layer 102 and the cling layer 104. Additional resins include polyolefin homopolymers and copolymers suitable for enhancement of mechanical properties such as tensile strength, elongation at break, tear and puncture resistance.

In order to ensure the film 100 meets the desired parameters in accordance with embodiments of the present invention, testing may be done to determine its physical properties. A parameter used to analyze the performance of such films is the force required to stretch the film to a desired percentage of its original length. This force is indicative of the load retention characteristics of the film. The films of embodiments of the present invention generally have a force to stretch the film to 100% of at least about 1000 psi. In many embodiments, the films generally have tensile strength of at least about 5000 psi and elongation to break of at least about 600%, as determined by ASTM D882.

Generally, embodiments of the film 100 are constructed according to conventional practices. The film 100 may be manufactured utilizing blown-film or cast-film co-extrusion. In one embodiment, a cast-film manufacturing process provides resin materials are heated to their molten state, and their viscosities are coordinated to prepare multilayer films in a uniform manner. The molten materials are conveyed to a co-extrusion adapter that combines the molten materials to form a multilayer co-extruded structure. The layered polymeric material is transferred through an extrusion die opened to a predetermined gap commonly in the range of between about 0.05 in. (0.13 cm) and 0.012 in. (0.03 cm). The material is then drawn down to the intended gauge thickness by means of a primary chill or casting roll maintained at between about 50 degrees F. to about 130 degrees F. Typical draw down ratios range from between about 5:1 to about 40:1.

The overall thickness of the stretch wrap film can vary widely according to end use specifications, but is generally in the range of the typical thicknesses for stretch wrap films. In one embodiment of the present invention, the overall film 100 thickness is between about 0.012 mm to about 0.125 mm. In one embodiment, the film 100 thickness is about 0.025 mm.

Once manufactured, in some embodiments, the slip layer 102 and/or the cling layer 104 of the film can be post-formation treated by implementing operations such as corona discharge, chemical treatment, flame treatment, etc., to modify the printability or ink receptivity of the surface(s) or to impart other desirable characteristics thereto.

In accordance with embodiments of the invention, the film may be provided in a non-stretched, i.e., unoriented, or merely a modestly stretched state prior to use. The film 100 is capable of being stretched from at least between about 40% and 400% during a final goods wrapping step.

While the foregoing is directed to embodiments of the present invention, other and further embodiments of the invention may be devised without departing from the basic scope thereof.

What is claimed is:

1. A multilayer film comprising:
   a slip layer comprising at least polypropylene and high density polyethylene blend;
   a cling layer comprising at least ethylene methyl acrylate copolymer and a tackifier; and an intermediary layer comprising at least linear low density polyethylene resin or its blend
   wherein the intermediary layer comprises about 68% by weight linear low density polyethylene, about 30% by weight metallocene polyethylene resin, and about 2% by weight titanium dioxide.

2. The multilayer film of claim 1, wherein the slip comprises about 5% to about 20% by weight, the cling layer comprises about 5% to about 20% by weight, and the intermediary layer comprises about 60% to about 90% by weight.

3. The multilayer film of claim 2, wherein the slip layer comprises about 15% by weight, the cling layer comprises about 10% by weight, and the intermediary layer comprises about 75% by weight.

4. The multilayer film of claim 1, wherein the slip layer has a coefficient of friction between about 0.3 to about 0.9, and wherein the cling layer has a cling force to the slip layer between about 5 g/in to about 80 g/in.

5. The multilayer film of claim 4, wherein the slip layer has a coefficient of friction of about 0.5, and wherein the cling layer has a cling force to the slip layer of about 40 g/in.

6. The multilayer film of claim 1, wherein the slip layer comprises between about 80% and about 99% by weight polypropylene and between about 1% to about 20% by weight high density polyethylene.

7. The multilayer film of claim 6, wherein slip layer comprises about 90% by weight polypropylene and about 10% by weight high density polyethylene.

8. The multilayer film of claim 1, wherein the cling layer comprises between about 80% and about 99% by weight ethylene methyl acrylate copolymer and between about 1% to about 20% by weight tackifier resin.

9. The multilayer film of claim 8, wherein the cling layer comprises about 95% by weight ethylene methyl acrylate and about 5% by weight tackifier resin.

10. The multilayer film of claim 1, wherein the multilayer film can withstand a force stretch of the film to about 600% at about 5000 psi.

11. The multilayer film of claim 1, wherein the overall multilayer film thickness is between about 0.012 mm to about 0.125 mm.

12. The multilayer film of claim 11, wherein the overall multilayer film thickness is about 0.025 mm.

13. A multilayer film comprising:
   a first surface layer having a coefficient of friction less than about 0.9, comprising at least polypropylene and high density polyethylene;
   a second surface layer having a cling force to the first surface greater than about 5 g/in, comprising at least ethylene methyl acrylate copolymer and a tackifier resin; and
   a core layer, positioned between the first surface and the second surface, comprising at least linear low density polyethylene resin
   wherein the core layer comprises about 68% by weight linear low density polyethylene resin, about 30% by weight a metallocene polyethylene resin, and about 2% by weight titanium dioxide.

14. The multilayer film of claim 13, wherein the coefficient of friction of the first surface layer is about 0.5, and wherein the cling force of the second surface layer to the first surface layer is about 40 g/in.

15. The multilayer film of claim 13, wherein the first surface layer comprises between about 5% to about 20% by weight, the second surface layer comprises between about 5% to about 20% by weight, and the core layer comprises between about 60% to about 90% by weight.

16. The multilayer film of claim 15, wherein the first surface layer comprises about 15% by weight, the second surface layer comprises about 10% by weight, and the core layer comprises about 75% by weight.

17. The multilayer film of claim 13, wherein the first surface layer comprises between about 80% and about 99% by weight polypropylene and between about 1% to about 20% by weight high density polyethylene.

18. The multilayer film of claim 17, wherein first surface layer comprises about 90% by weight polypropylene and about 10% by weight high density polyethylene.

19. The multilayer film of claim 13, wherein the second surface layer comprises between about 80% and about 99% by weight ethylene methyl acrylate copolymer and between about 1% to about 20% by weight tackifier resin.

20. The multilayer film of claim 19, wherein the second surface layer comprises about 95% by weight ethylene methyl acrylate and about 5% by weight tackifier resin.

21. A multilayer film comprising:
   a slip layer comprising at least polypropylene and high density polyethylene blend;
   a cling layer comprising at least ethylene methyl acrylate copolymer and a tackifier; and
   an intermediary layer comprising between about 65% and about 70% by weight linear low density polyethylene resin, about 30% by weight metallocene polyethylene resin, and 0% to about 5% by weight titanium dioxide.

22. A multilayer film comprising:
   a slip layer comprising at least polypropylene and high density polyethylene blend;
   a cling layer comprising at least ethylene methyl acrylate copolymer and a tackifier; and
   an intermediary layer comprising between about 65% and about 95% by weight linear low density polyethylene resin and between about 5% and about 35% by weight metallocene polyethylene resin.

23. The multilayer film of claim 22, wherein the intermediary layer further comprises titanium dioxide.

24. The multilayer film of claim 22, wherein the slip layer comprises about 5% to about 20% by weight, the cling layer comprises about 5% to about 20% by weight, and the intermediary layer comprises about 60% to about 90% by weight.

25. The multilayer film of claim 22, wherein the slip layer comprises about 15% by weight, the cling layer comprises about 10% by weight, and the intermediary layer comprises about 75% by weight.

26. The multilayer film of claim 22, wherein the slip layer has a coefficient of friction between about 0.3 to about 0.9, and wherein the cling layer has a cling force to the slip layer between about 5 g/in to about 80 g/in.

27. The multilayer film of claim 22, wherein the slip layer has a coefficient of friction of about 0.5, and wherein the cling layer has a cling force to the slip layer of about 40 g/in.

28. The multilayer film of claim 22, wherein the slip layer comprises between about 80% and about 99% by weight polypropylene and between about 1% to about 20% by weight high density polyethylene.

29. The multilayer film of claim 22, wherein slip layer comprises about 90% by weight polypropylene and about 10% by weight high density polyethylene.

30. The multilayer film of claim 22, wherein the cling layer comprises between about 80% and 99% by weight ethylene methyl acrylate copolymer and between about 1% to about 20% by weight tackifier resin.

31. The multilayer film of claim 22, wherein the cling layer comprises about 95% by weight ethylene methyl acrylate and about 5% by weight tackifier resin.

32. The multilayer film of claim 22, wherein the overall multilayer film thickness is between about 0.012 mm to about 0.125 mm.

33. A multilayer film comprising:
a slip layer comprising at least polypropylene and high density polyethylene blend;
a cling layer comprising at least ethylene methyl acrylate copolymer and a tackifier; and
an intermediary layer comprising linear low density polyethylene resin and between about 5% and about 35% by weight metallocene polyethylene resin.

34. The multilayer film of claim 33, wherein the coefficient of friction of the slip layer is about 0.5, and wherein the cling force of the cling layer to the slip layer is about 40 g/in.

35. The multilayer film of claim 33, wherein the slip layer comprises between about 5% to about 20% by weight, the cling layer comprises between about 5% to about 20% by weight, and the intermediary layer comprises between about 60% to about 90% by weight.

36. The multilayer film of claim 35, wherein the slip layer comprises about 15% by weight, the cling layer comprises about 10% by weight, and the intermediary layer comprises about 75% by weight.

37. The multilayer film of claim 33, wherein the slip layer comprises between about 80% and about 99% by weight polypropylene and between about 1% to about 20% by weight high density polyethylene.

38. The multilayer film of claim 37, wherein slip layer comprises about 90% by weight polypropylene and about 10% by weight high density polyethylene.

39. The multilayer film of claim 33, wherein the cling layer comprises between about 80% and 99% by weight ethylene methyl acrylate copolymer and between about 1% to about 20% by weight tackifier resin.

40. The multilayer film of claim 39, wherein the cling layer comprises about 95% by weight ethylene methyl acrylate and about 5% by weight tackifier resin.

41. The multilayer film of claim 33, wherein the multilayer film can withstand a force stretch of the film to about 600% at about 5000 psi.

42. The multilayer film of claim 33, wherein the overall multilayer film thickness is between about 0.012 mm to about 0.125 mm.

43. The multilayer film of claim 33, wherein the overall multilayer film thickness is about 0.025 mm.

* * * * *

UNITED STATES PATENT AND TRADEMARK OFFICE
CERTIFICATE OF CORRECTION

| | | |
|---|---|---|
| PATENT NO. | : 7,601,420 B2 | Page 1 of 1 |
| APPLICATION NO. | : 11/763639 | |
| DATED | : October 13, 2009 | |
| INVENTOR(S) | : Alexander Tukachinsky | |

It is certified that error appears in the above-identified patent and that said Letters Patent is hereby corrected as shown below:

Title Pg. Item (75) Inventor: should be changed from "Alexander Tukachinksy" to --Alexander Tukachinsky--.

Signed and Sealed this

Twenty-fourth Day of November, 2009

David J. Kappos
*Director of the United States Patent and Trademark Office*